(12) United States Patent  
Vishnia

(10) Patent No.: US 7,268,960 B2
(45) Date of Patent: Sep. 11, 2007

(54) MOUNT FOR AN OPTICAL STRUCTURE AND METHOD OF MOUNTING AN OPTICAL STRUCTURE USING SUCH MOUNT

(75) Inventor: Itai Vishnia, Setauket, NY (US)

(73) Assignee: PLX, Inc., Deer Park, NY (US)

( * ) Notice: Subject to any disclaimer, the term of this patent is extended or adjusted under 35 U.S.C. 154(b) by 0 days.

(21) Appl. No.: 11/266,906

(22) Filed: Nov. 4, 2005

(65) Prior Publication Data
US 2007/0103797 A1 May 10, 2007

(51) Int. Cl.
G02B 7/02 (2006.01)
G02B 7/182 (2006.01)
G02B 5/122 (2006.01)

(52) U.S. Cl. ............... 359/819; 359/820; 359/529; 359/871; 356/614; 248/476; 353/31; 348/374; 257/433

(58) Field of Classification Search ............ 359/819, 359/811, 820, 892, 871, 529; 356/614, 372, 356/375; 248/476, 483; 348/374, 335, 340; 257/433, 678, 711, 788, 794, 730; 353/31
See application file for complete search history.

(56) References Cited

U.S. PATENT DOCUMENTS

| 3,977,765 | A |   | 8/1976  | Lipkins |         |
|-----------|---|---|---------|---------|---------|
| 4,723,833 | A | * | 2/1988  | Yamada  | 359/820 |
| 5,122,901 | A |   | 6/1992  | Bleier  |         |
| 5,335,111 | A |   | 8/1994  | Bleier  |         |
| 5,781,351 | A | * | 7/1998  | Murakami et al. | 359/808 |
| 5,861,956 | A | * | 1/1999  | Bridges et al. | 356/614 |
| 6,639,742 | B2| * | 10/2003 | Snively et al. | 359/819 |
| 6,956,615 | B2| * | 10/2005 | Nakagishi et al. | 348/375 |
| 2003/0048533 | A1 |   | 3/2003 | Lyons, III |         |

\* cited by examiner

Primary Examiner—Loha Ben
(74) Attorney, Agent, or Firm—Michael R. Gilman; Kaplan Gilman Gibson & Dernier L.L.P.

(57) ABSTRACT

An improved mount for, and method of mounting an, optical structure is provided, wherein the optical structure has at least one mounting surface. The mount has a mounting section with at least one surface extending therealong for receipt thereagainst of a portion of the at least one mounting surface of the optical structure. The at least one surface of the mounting section has at least one opening extending therethrough, or at least one cavity therein, for receipt of adhesive. The adhesive will at least partially fill the at least one opening/cavity and touch a portion of the at least one mounting surface of the optical structure in order to mount the optical structure. The method of mounting the optical structure to the mount comprises the steps of, forming the mount with at least one mounting section and at least one surface extending therealong, forming at least one opening/cavity in the at least one mounting section, either abutting a portion of the surface of the optical structure against the at least one surface of the at least one mounting section and then applying adhesive into the at least one opening of the at least one mounting section, or first applying adhesive into the at least one cavity and then abutting the optical structure thereagainst, and for either sequence, allowing the adhesive to dry within the at least one opening/cavity and touching the surface of the optical structure.

34 Claims, 13 Drawing Sheets

MOUNT FOR AN OPTICAL STRUCTURE AND METHOD OF MOUNTING AN OPTICAL STRUCTURE USING SUCH MOUNT

BACKGROUND OF THE INVENTION

This invention relates to the field of mounts for optical structures, including but not limited to, reflective panels and hollow retroreflectors.

Optical structures such as, but not limited to, reflective panels (mirror panels) and hollow retroreflectors are old in the art. Hollow retroreflectors are made of three mirror panels joined together preferably having optically flat reflective surfaces disposed at right angles to each other, and meeting at what can be described as a common inside corner of an imaginary cube. Hollow retroreflectors in general have the essential property of causing incident and reflected light rays to travel along substantially parallel paths.

When hollow retroreflectors are assembled for high accuracy and precision it is important to maintain the mutual perpendicularity of the reflective surfaces and sometimes essential to ensure that the retroreflector as a whole does not move. The perpendicularity of the reflective surfaces is affected by external stresses. With regard to high accuracy and precise reflective panels, such as mirror panels to be used for high accuracy purposes, it is also important to try and maintain as optically flat as possible the reflective surface of the panel.

Examples of external stresses that can effect the optical flatness of a reflective panel and/or the perpendicularity of reflective surfaces of abutting reflective panels of a hollow retroreflector, are thermal expansion or contraction of the substrate material from which the panels are made, deflection caused by curing of the adhesives used to join elements together and/or the mass of the panels themselves. Accordingly, it would be desirable to assemble together the elements of a hollow retroreflector and/or to assemble a reflective panel to a mount, in such a manner as to reduce these stresses. It would also be desirable that the manner of mounting a retroreflector to its mount not add to these stresses, but nevertheless, securely retaining the retroreflector on the mount. Examples of hollow retroreflector mounts which have proven successful in maintaining the reflective surfaces in their perpendicular orientations are found in U.S. Pat. No. 3,977,765, to Morton S. Lipkins, 5,122,901, to Zvi Bleier, and 5,335,111, also to Bleier.

The present mount also achieves secure mounting of the optical structure in a manner that greatly reduces deflective stresses on the reflective surface(s) of the structure, while also helping to ensure a secure mount of the structure. For example, it is often important when measuring distances using a retroreflector to reduce to a minimum fluctuations which may occur because of movement of the retroreflector between successive measurements due to the external stresses of mass and/or temperature change. The mount and manner of mounting of the present invention helps to significantly reduce such movement to a minimum.

The mount also allows for easy and secure mounting of the optical structure onto a support structure.

SUMMARY OF THE INVENTION

In accordance with the invention, an improved mount for, and method of mounting an, optical structure is provided, wherein the optical structure has at least one mounting surface. The mount has a mounting section and at least one surface extending along at least a portion of the mounting section for receipt thereagainst of a portion of the at least one mounting surface of the optical structure. The at least one surface of the mounting section has at least one opening extending therethrough for receipt of adhesive therein. The adhesive will at least partially fill the at least one opening and touch a portion of the at least one mounting surface of the optical structure in order to adhere the optical structure to the mount. The method of mounting the optical structure to the mount comprises the steps of, forming the mount with at least one mounting section and at least one surface extending along a portion of the at least one mounting section, forming at least one opening extending through the at least one surface and the portion of the at least one mounting section, abutting a portion of the surface of the optical structure against the at least one surface of the at least one mounting section, applying adhesive into the at least one opening of the at least one mounting section so that the adhesive at least partially fills the at least one opening and touches the surface of the optical structure and allowing the adhesive to dry within the at least one opening and touching the surface of the optical structure.

The mount also has a base having a bore extending therein for receipt of a corresponding member extending from a support. In the preferred embodiment, the bore and the corresponding member are threaded. In like regard, the support may have the bore for receipt of an element extending from the base of the mount. The element and support bore may also be correspondingly threaded. Such a system helps to ensure easy and secure mounting to the support structure.

Accordingly, it is an object of the invention to provide an improved mount for an optical structure, including but not limited to, a reflective panel and a hollow retroreflector.

Another object of the invention is to provide an improved mount for an optical structure which causes minimal external stresses to the reflective surfaces of the optical structure.

Still another object of the invention is to provide an improved mount for an optical structure wherein the mount achieves reductions in movement of the optical structure in order to achieve higher-accuracy distance measurements.

Yet a further object of the invention is to provide an improved mount for an optical structure wherein the mounting of the mount and optical structure to a support structure is easy and secure.

It is even a further object of the invention to provide an improved method of mounting an optical structure onto such an improved mount.

Other objects of the invention will in part be obvious and will in part be apparent from the following description.

BRIEF DESCRIPTION OF THE DRAWINGS

For a fuller understanding of the invention, reference is made to the following description taken in connection with the accompanying drawings, in which.

DETAILED DESCRIPTION OF THE PREFERRED EMBODIMENTS

Referring to the figures, a mount for an optical structure made in accordance with the invention is generally designated at 10. In the particular case of the figures of this application, the optical structure portrayed is that of a hollow retroreflector, which will hereinafter generally be designated in the figures at 20. It is of course to be understood that other optical structures are anticipated to be compatibly used with mount 10, including but not limited to, individual mirror panels (not shown) and/or roof mirrors (not shown).

Retroreflector 20 is preferably made of fused quartz or fine annealed Pyrex, while mount 10 is preferably made of a metal alloy having a very low coefficient of thermal expansion, such as INVAR.

Figure 1:
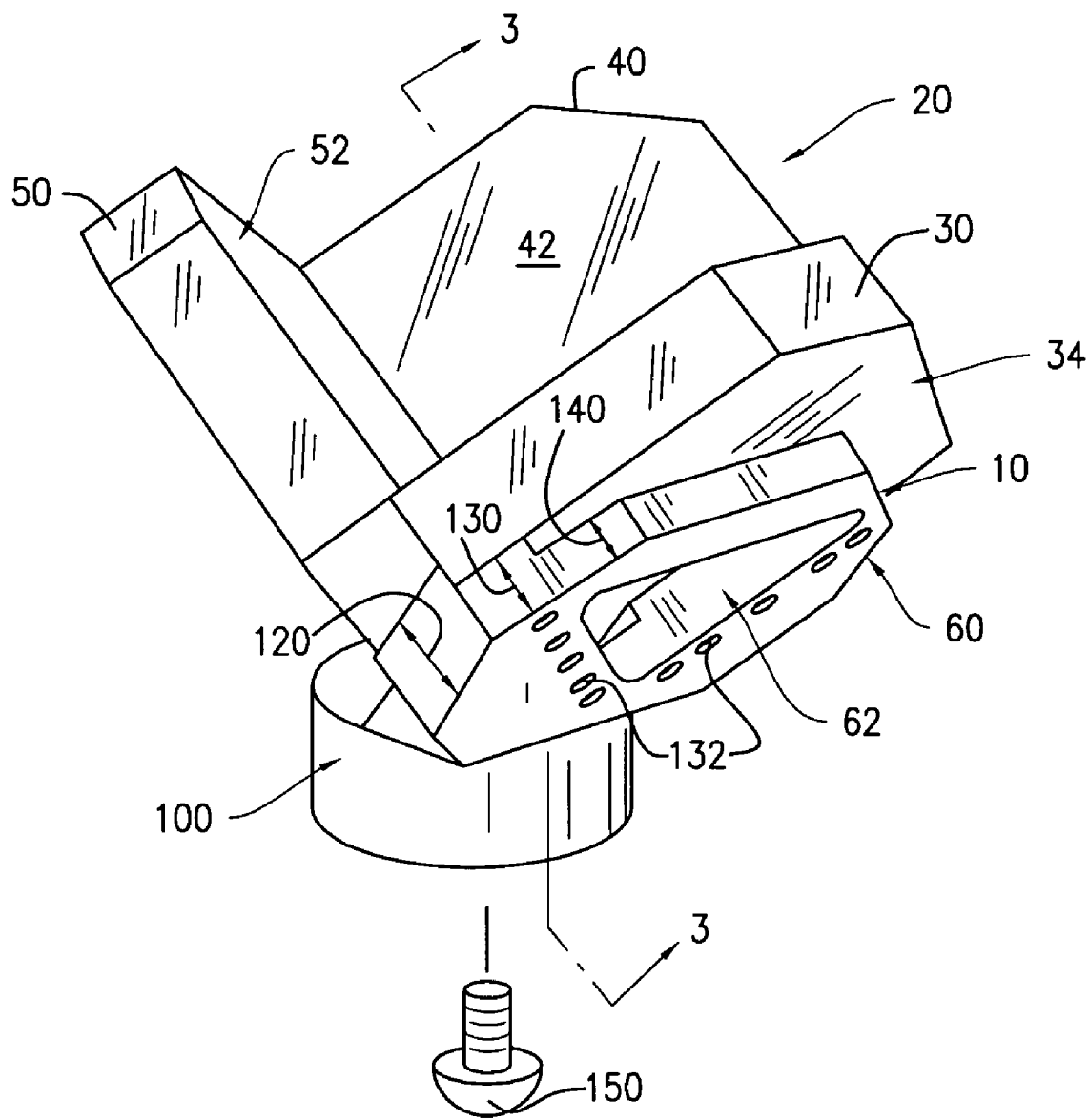
FIG. 1 is a perspective view of a mount having an optical structure thereon, made in accordance with the invention.
Figure 2:
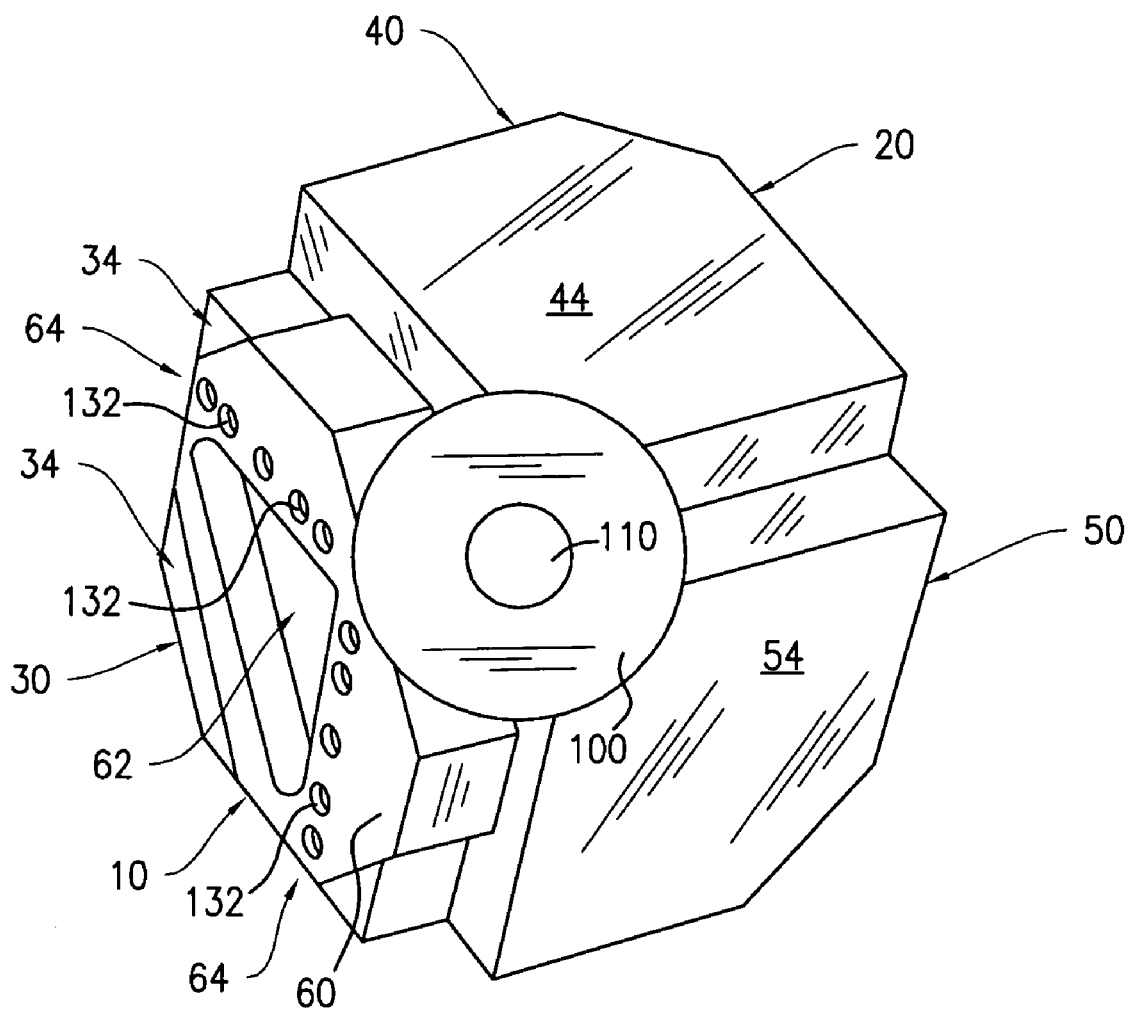
FIG. 2 is a bottom plan view of the structure of FIG. 1.

Hollow retroreflector 20 is comprised of a first panel 30, a second panel 40, and a third panel 50. Each of the panels 30, 40 and 50 has a corresponding reflective surface 32, 42 and 52. The higher the degree of optical flatness achieved in surfaces 32, 42 and 52 will in part determine the accuracy of the corresponding panels 30, 40 and 50. Panels 30, 40 and 50 are disposed substantially at right angles to each other so that reflective surfaces 32, 42 and 52 are also disposed at right angles to each other. Each of panels 30, 40 and 50 also has non-reflective, back surfaces 34, 44 and 54 which are opposite to reflective surfaces 32, 42 and 52, as best seen in FIGS. 1 and 2.

As with all hollow retroreflectors, retroreflector 20 is designed to receive an incoming (incident) light ray (not shown) and reflect the light ray off of the reflective surfaces 32, 42 and 52 and out from retroreflector 20 along a path substantially parallel to the incident light ray. Of course, the incident light ray can initially strike any one of the reflective surfaces without bearing upon the accuracy of the parallelism of the reflected light ray. The accuracy tolerances for retroreflector 20 will almost always depend upon the function to be performed by retroreflector 20. If high degrees of accuracy; i.e., parallelism of the incident and reflected light rays is a primary purpose of retroreflector 20, then high degrees of precision must be created and maintained with respect to the perpendicularity of reflective surfaces 32, 42 and 52.

Figure 4:
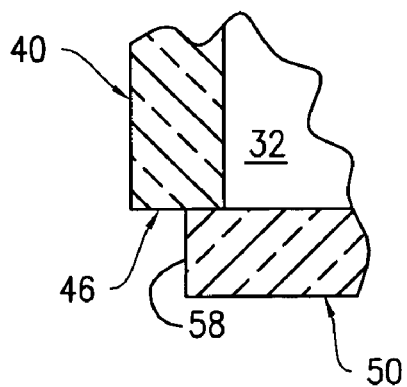
FIG. 4 is a cross-sectional view taken along line 4-4 of FIG. 3.
Figure 5:
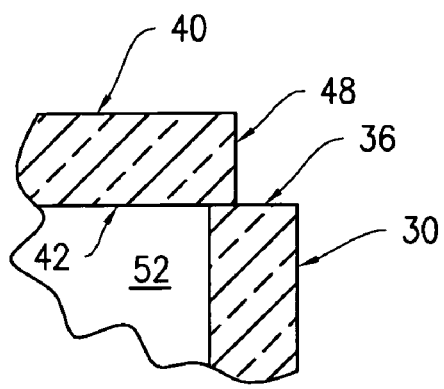
FIG. 5 is a cross-sectional view taken along line 5-5 of FIG. 3.
Figure 6:
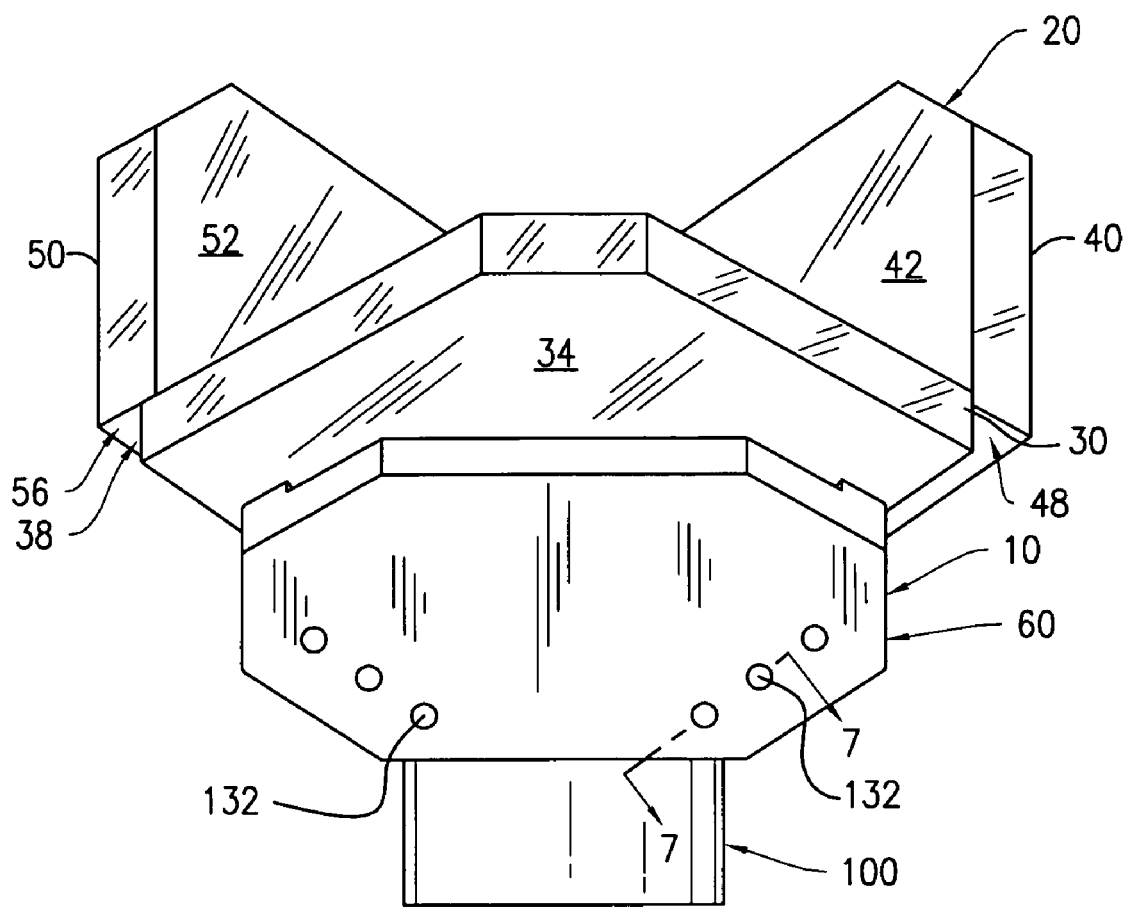
FIG. 6 is a rear elevational view of another embodiment of the mount made in accordance with the invention.
Figure 7:
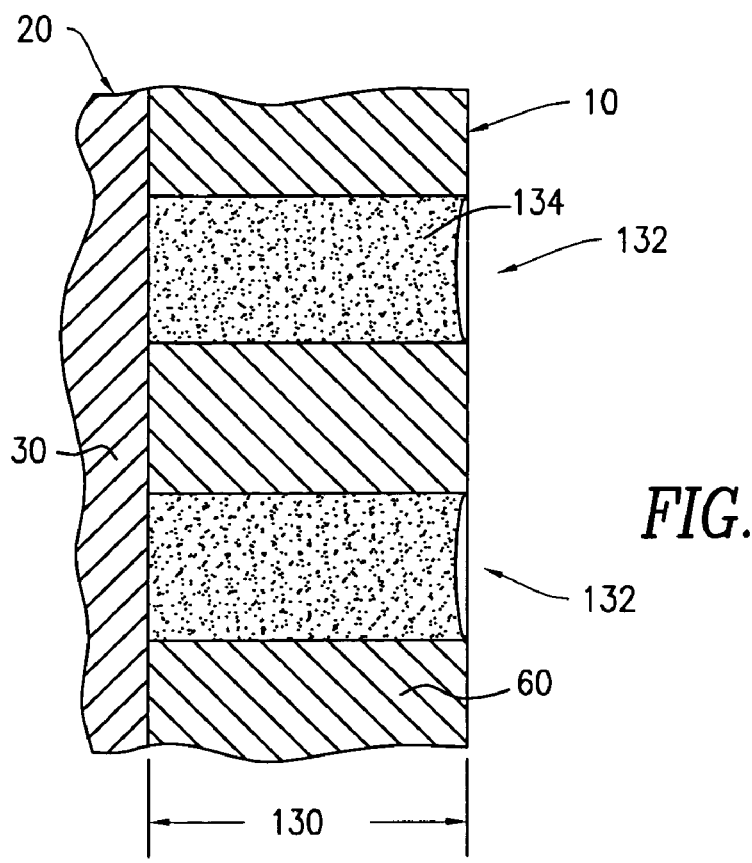
FIG. 7 is a cross-sectional view taken along line 7-7 of FIG. 6.

One construction for a hollow retroreflector is as disclosed in U.S. Pat. No. 3,663,084 to Morton S. Lipkins. If the construction shown in the '084 patent is used herein, then each of panels 30, 40 and 50 of hollow retroreflector 20 has first and second sides 36 and 38, 46 and 48 and 56 and 58, respectively. The first and second sides of each of the panels are substantially perpendicular to each other and to each of the other sides of the other panels. As is seen best in FIGS. 3-5, first side 46 of panel 40 is abutted against and adhered to reflective surface 52 of panel 50, first side 36 of panel 30 is abutted against and adhered to reflective surface 42 of panel 40, and first side 56 of panel 50 is abutted against and adhered to reflective surface 32 of panel 30. Accordingly, each of panels 30, 40 and 50 is simultaneously an abutting panel at first sides 36, 46 and 56, and an adjacent panel at second sides 38, 48 and 58.

Turning now to a discussion of mount 10, it is seen from the figures that mount 10 has an upper member 60 and a base member 100. Base member 100 is preferably cylindrical in shape, but may be any shape.

Figure 3:
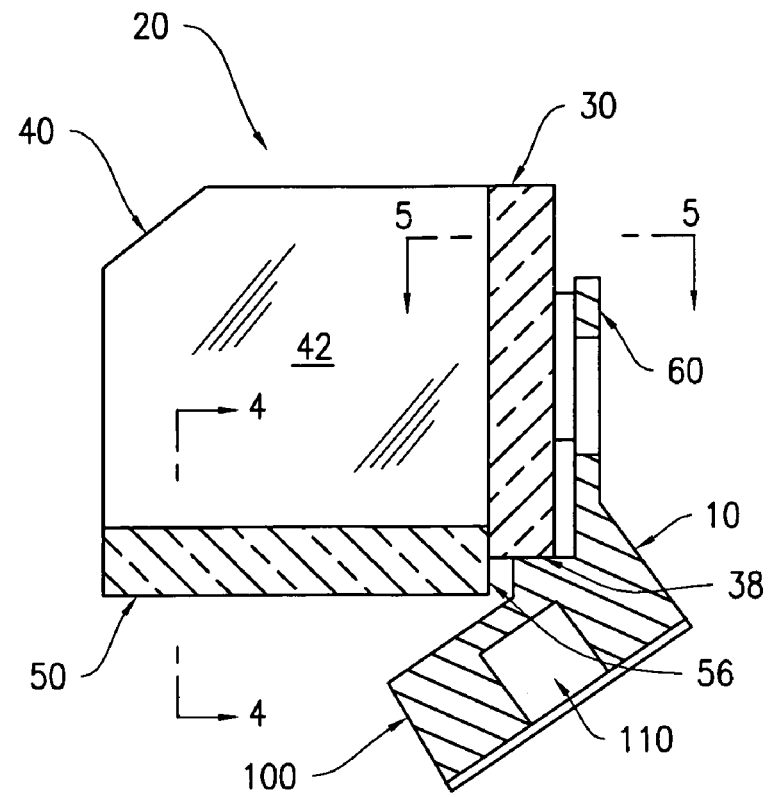
FIG. 3 is a cross-sectional view taken along line 3-3 of FIG. 1.

As seen in FIG. 3, base member 100 has extending therein an opening 110. Opening 110 preferably extends through a bottom surface 112 of base 100, but may be placed anywhere on base 100. Opening 110 is preferably threaded to receive a correspondingly threaded member 150 extending from some type of support structure (not shown). However, it is also to be understood that instead of having opening 110, base member 100 may have an outwardly extending member (not shown) which would in turn be received into a cooperating opening on a support structure (not shown). In this instance also it is preferred that the extending member and support opening both be threaded to allow for a more secure connection between the two. Additionally, other mounting means are intended to be encompassed in the invention, such as the use of a clamp from the support structure to securely hold base member 100, as are other constructions.

Figure 8:
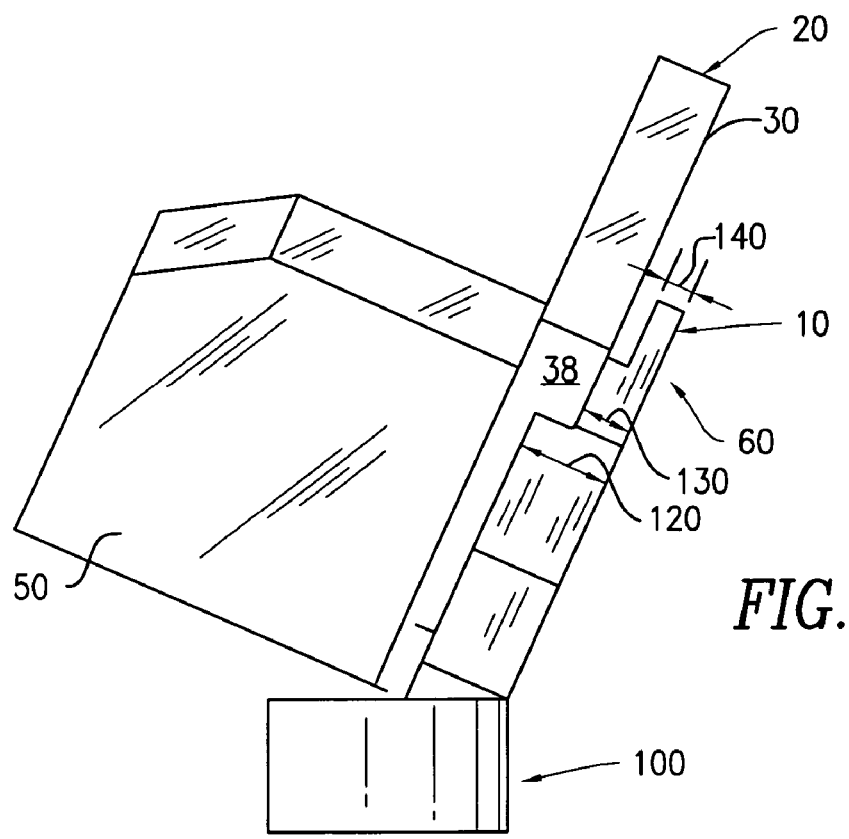
FIG. 8 is a right side elevational view of the mount of any of the structures of FIGS. 1, 6 or 10-14.
Figure 9:
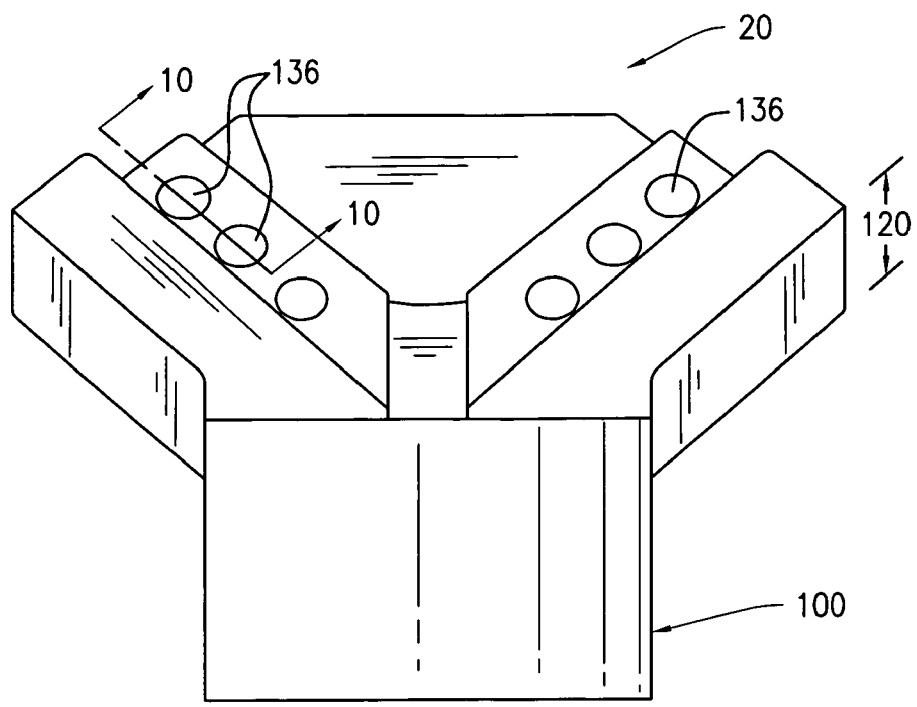
FIG. 9 is a front elevational view of the mount of FIG. 6, without the optical structure mounted thereon.

Turning now to a discussion of upper member 60 of mount 10, as best seen in FIGS. 1 and 8, upper member 60 preferably, but not mandatorily, has three levels of thickness: the thickest level being that closest to base 100, and designated 120; the second thickest level designated 130; and the least thick level designated 140. Although it is also to be understood herein that level 140 is not essential and could, for all intents and purposes, be left off. In fact, as seen in FIGS. 1 and 2, the large hole 62 in upper member 60 corresponds with a portion of mounting section 60 at the level 140 thickness.

Mount 100 is also shown in the figures to have openings 132 extending through level 130 of upper member 60 (see FIGS. 1, 2, 6, 7 and 11-15). It is through the application of adhesive 134 into openings 132 (see FIG. 7) that panel 30 of optical structure 20 is adhered to mount 10 in one embodiment. In particular, in the embodiments of FIGS. 1 and 6, level 130 of upper member 60 is a mounting section of mount 10 for receipt thereagainst of a mounting surface of optical structure 20. In the particular case of the preferred embodiments of the figures, the mounting surface of optical structure 20 is found along back surface 34 of panel 30. By holding optical structure 20 in such a manner that the mounting surface of back surface 34 abuts against mount 10's mounting section and then applying adhesive 134 into opening(s) 132 so that adhesive 134 at least partially fills opening(s) 132 and touches the mounting surface of optical structure 20, adhesive 134 will cure/dry within opening(s) 132 and in contact with the mounting section and the mounting surface of optical structure 20 so as to adhere optical structure 20 to mount 10. In the preferred embodiments, adhesive 134 is not meant to leech out of opening(s) 132 between the mounting surface of optical structure 20 and the mounting section of mount 10, but is instead meant to substantially/essentially, fully remain and dry/cure within opening(s) 132, only touching the mounting surface of optical structure 20 over a surface area thereof substantially conforming with the cross-sectional size of openings 132. While it is recognized that prevention of 100% of the leeching of adhesive 134 between the mounting surface of optical structure 20 and the mounting surface of the mounting section of mount 10 is probably not achievable, small amounts of leeching of adhesive 134 will not adversely impact on the effect desired to be achieved through the manner of mounting described herein. Accordingly, in the preferred embodiments, the application of adhesive 134 occurs after optical structure 20 is abutted against the mounting section of mount 10, and only minor leeched amounts of adhesive 134, if any, should touch an outside surface of the mounting section of mount 10 that faces optical structure 20.

It is further to be noted that the size of mount 10 will usually be determined by the size of the optical structure 20 needed to be mounted thereto. For example, one will see from a review of mount 10 of FIGS. 1-5, that a larger optical structure 20 is shown for this embodiment then the optical structure 20 of FIGS. 6-8, since mount 10 of the embodiment of FIGS. 1-5 has two mounting sections 64, each having five (5) openings 132 extending therealong (see FIG. 2), while mount 10 of the embodiment of FIGS. 6-8 has only three (3) openings 132 extending along its two mounting sections (see FIG. 6). Accordingly, the number of openings 132 needed for any given mount 10 will vary, and will primarily be determined by the size of the optical structure 20 to be mounted thereto. It is therefore conceivable that as little as one mounting section on mount 10, having only one opening could be necessary for a very small and light optical structure, while mounts 10 having the two mounting sections shown in the present figures and more than 5 openings could be necessary for larger, heavier optical structures. However, no matter the size of the mount or optical structure, the method of mounting the same together is not anticipated to vary from forming the mount and at least one opening through the mounting section thereof, abutting a portion of the optical structure against the surface of the mounting section, applying adhesive into the opening(s) to at least partially fill them and touch the abutting optical structure and allowing the adhesive to dry/cure within the opening(s) and touching the optical structure. It being understood herein that injection of the adhesive into the opening(s) is anticipated but not mandatory.

It is also best seen in FIG. 3, that when optical structure 20 is mounted to mount 10 as described above, edge 38 of panel 30 is allowed to touch the upper surface of level 120 of upper member 60, and that essentially no adverse distortional effects to the flatness of reflective surface 32 of panel 30 is created by this contact. Of course, it is not necessary that edge 38 and level 120 touch.

Figure 12:
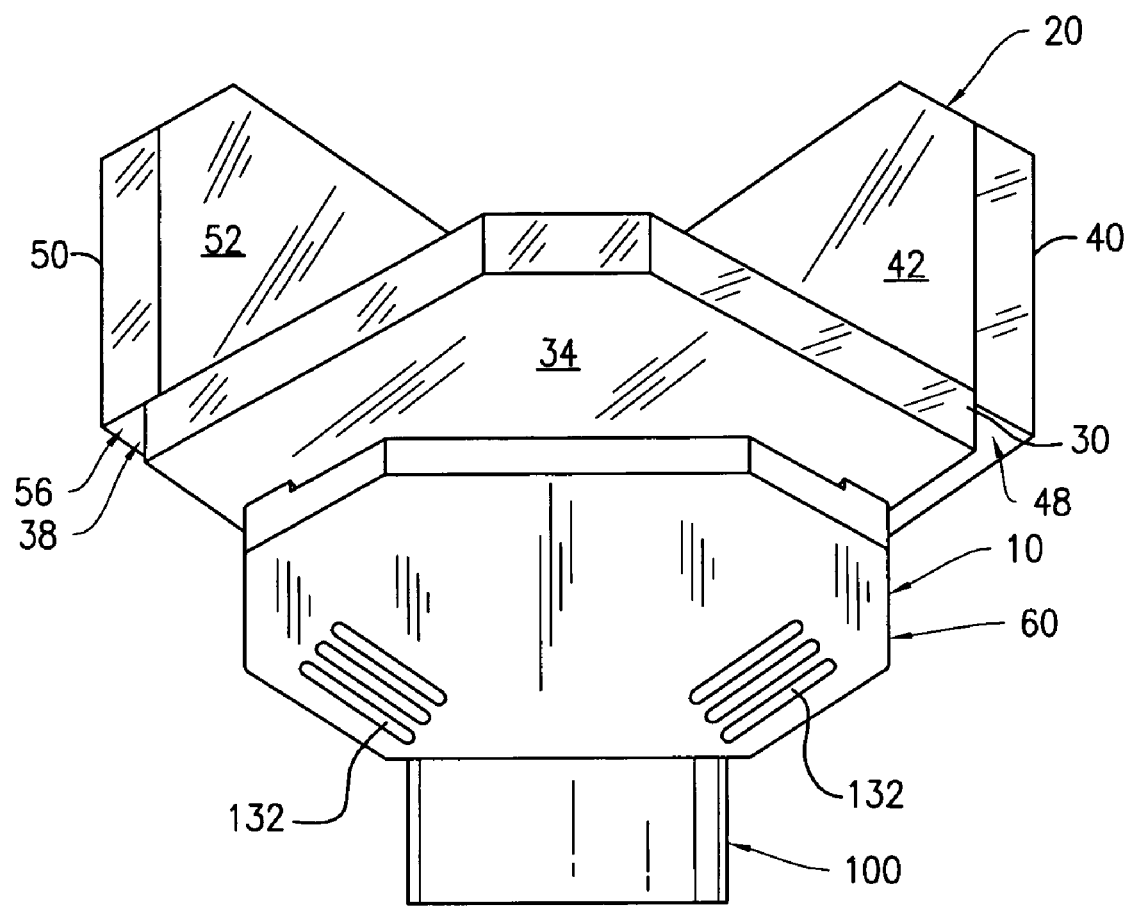
FIG. 12 is a rear elevational view of a further alternate embodiment of a mount made in accordance with the invention.
Figure 13:
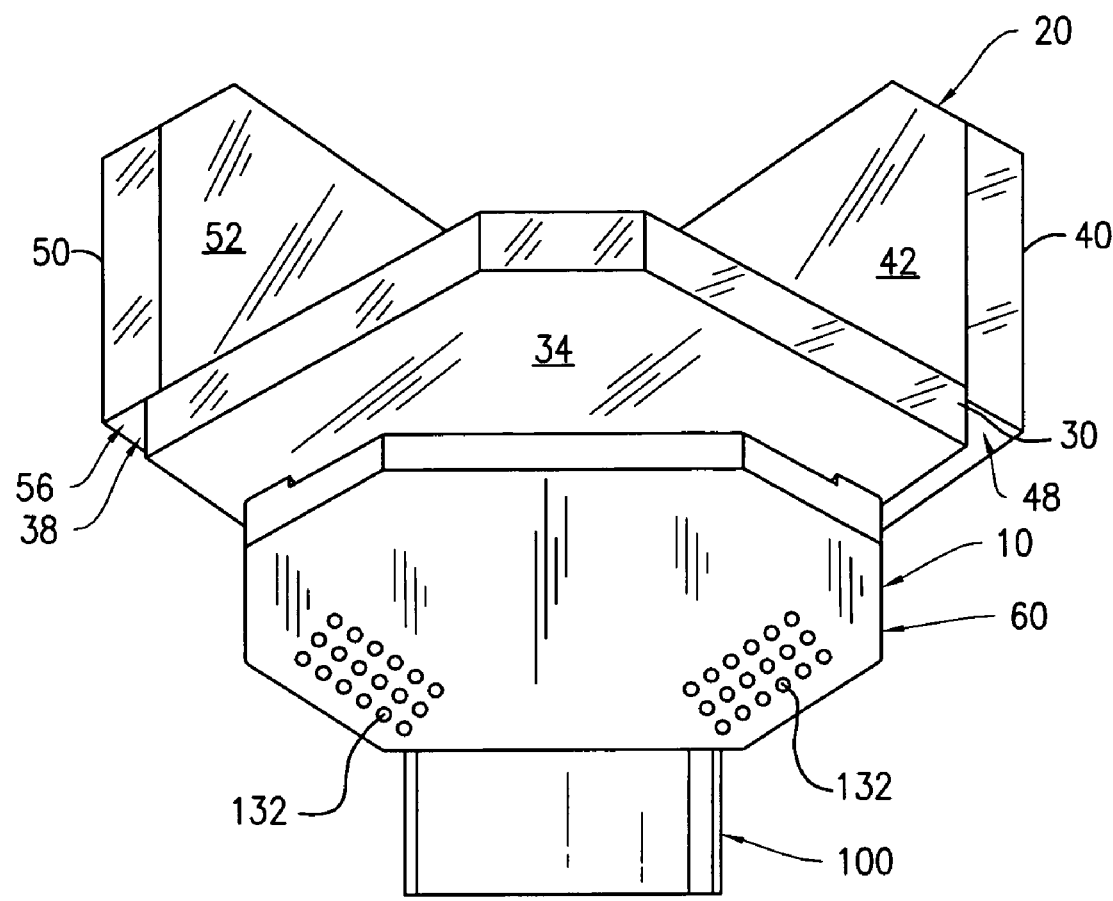
FIG. 13 is a rear elevational view of a further alternate embodiment of a mount made in accordance with the invention.
Figure 14:
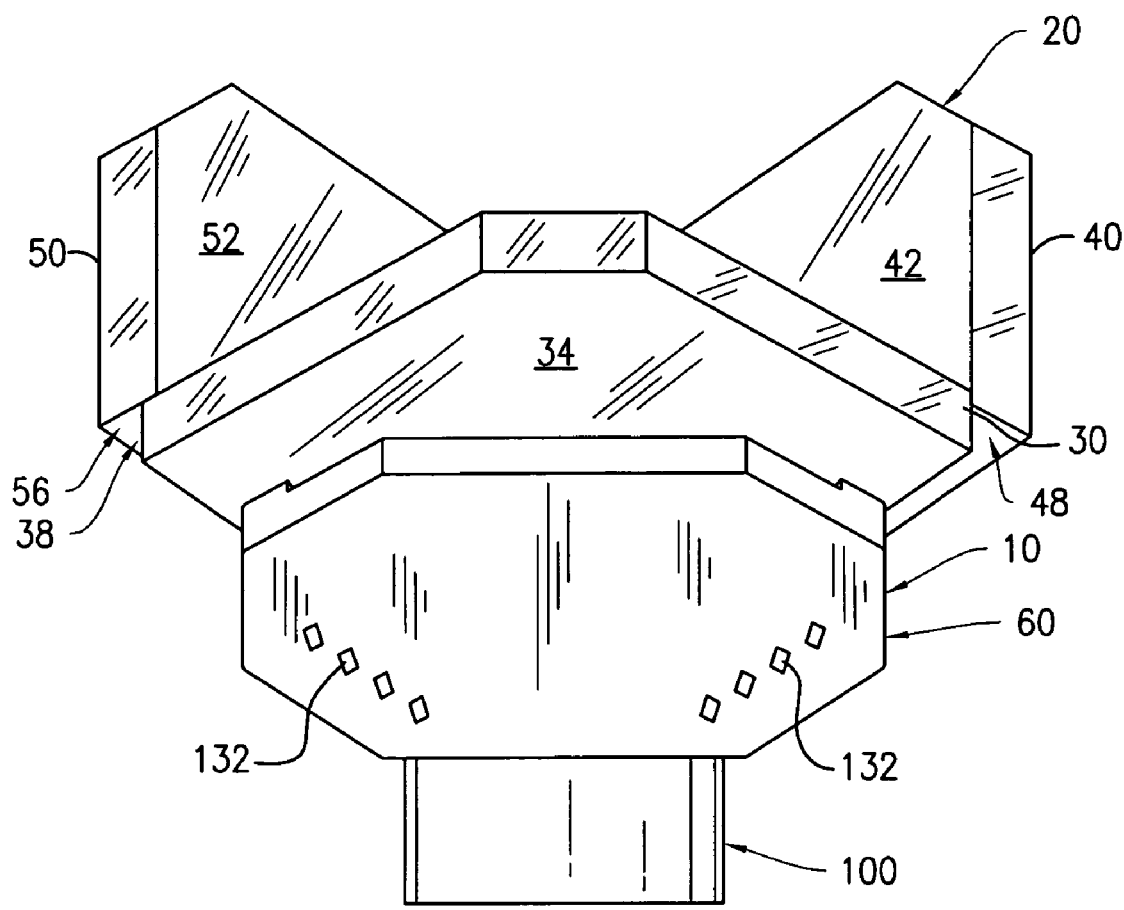
FIG. 14 is a rear elevational view of a further alternate embodiment of a mount made in accordance with the invention.
Figure 15:
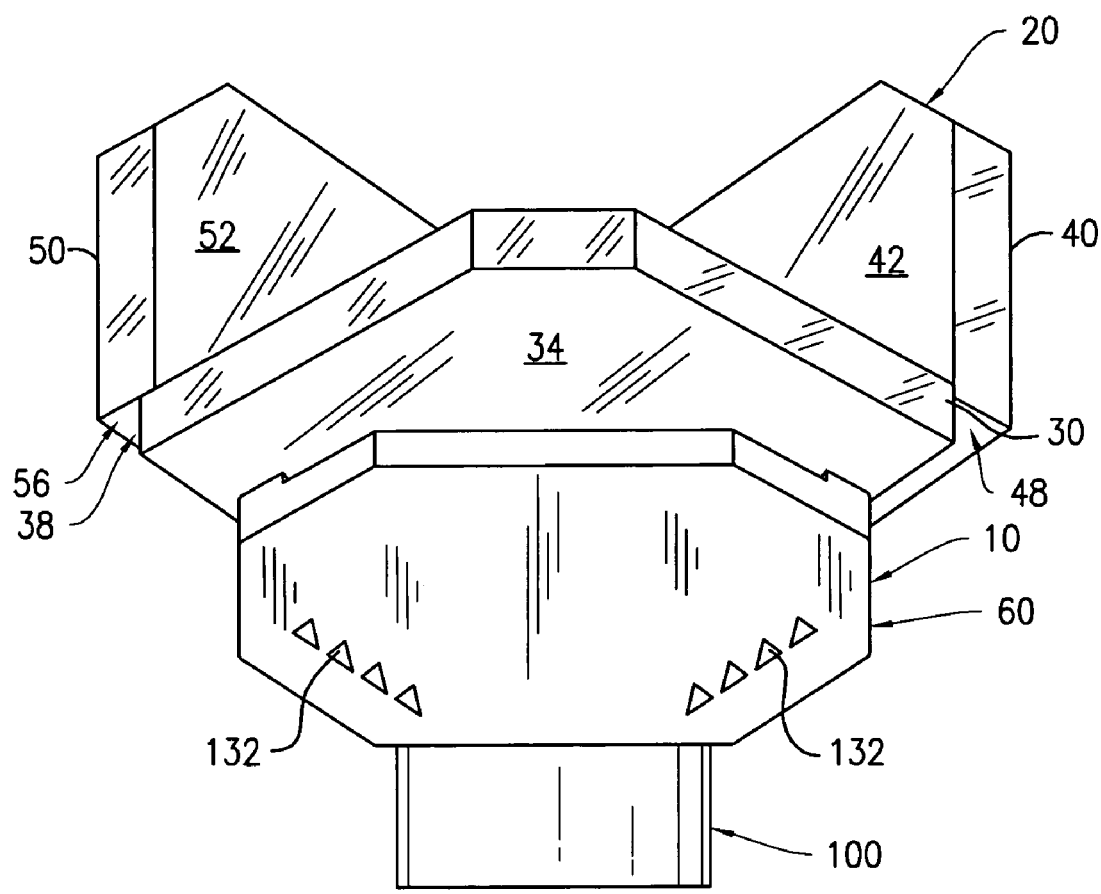
FIG. 15 is a rear elevational view of a further alternate embodiment of a mount made in accordance with the invention.

Turning now to FIGS. 11-15, different ways of forming opening(s) 132 are shown. In FIG. 1, opening(s) 132 are elongate slots as opposed to the circular holes of the embodiments of FIGS. 1 and 6. In FIG. 12, opening(s) 132 are multiple elongate slots. In FIG. 13, opening(s) 132 are a multitude of smaller preferably circular holes. In FIG. 14, opening(s) 132 are shown to be square, while in FIG. 15 they are shown to be triangular. It is also to be understood herein that other shapes may be used, but are not shown, such as, but not limited to, star shaped, diamond shaped, rectangular in shape and oval shaped (although the slot shapes of FIGS. 11 and 12 could certainly be said to show an oval in shape).

Figure 16:
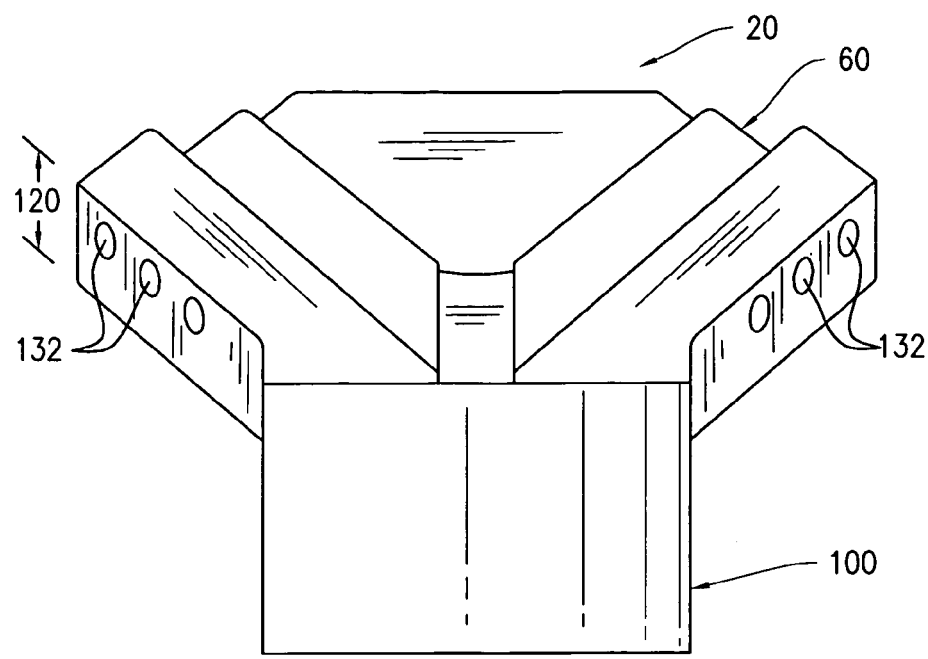
FIG. 16 is a front elevational view of still a further alternate embodiment of a mount made in accordance with the invention.
Figure 17:
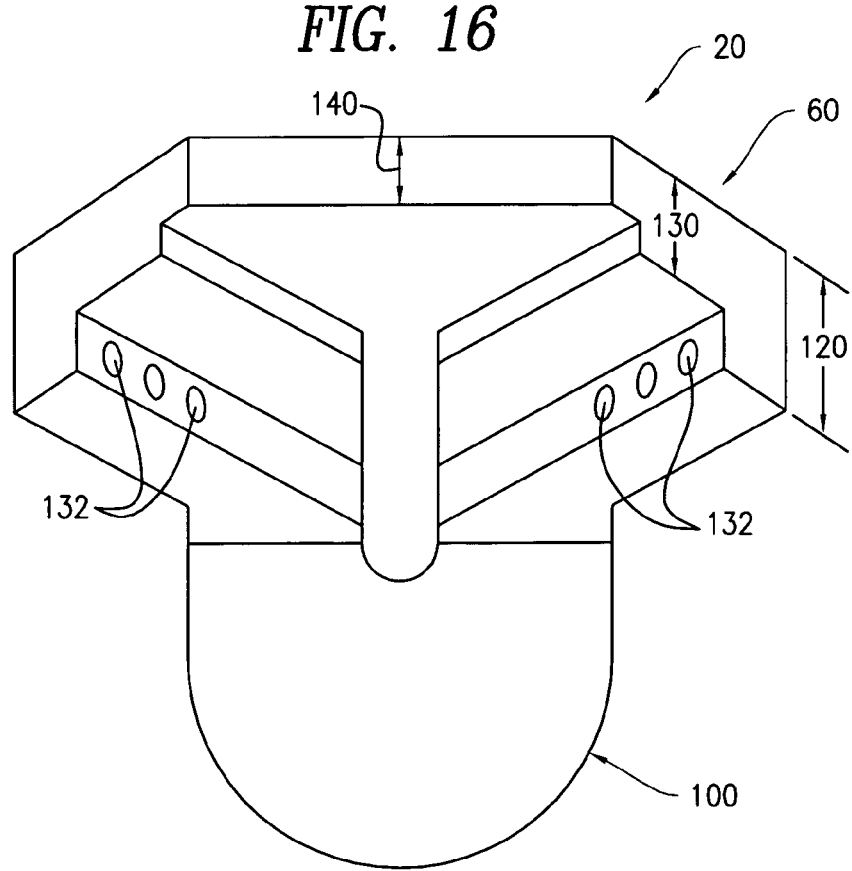
FIG. 17 is a top plan view of the mount of FIG. 16.
Figure 18:
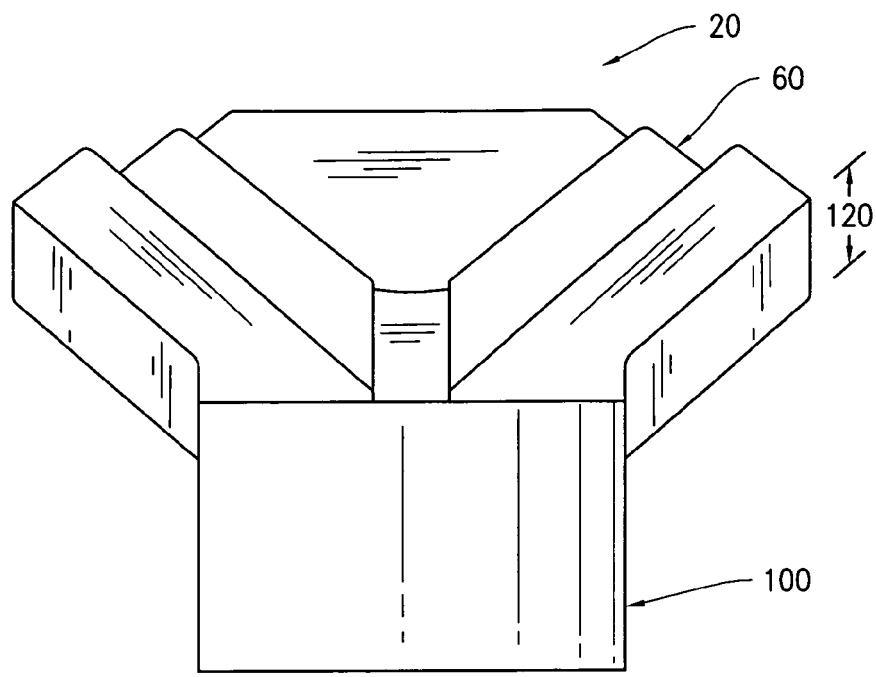
FIG. 18 is a front elevational view of an even further embodiment of a mount made in accordance with the invention.
Figure 19:
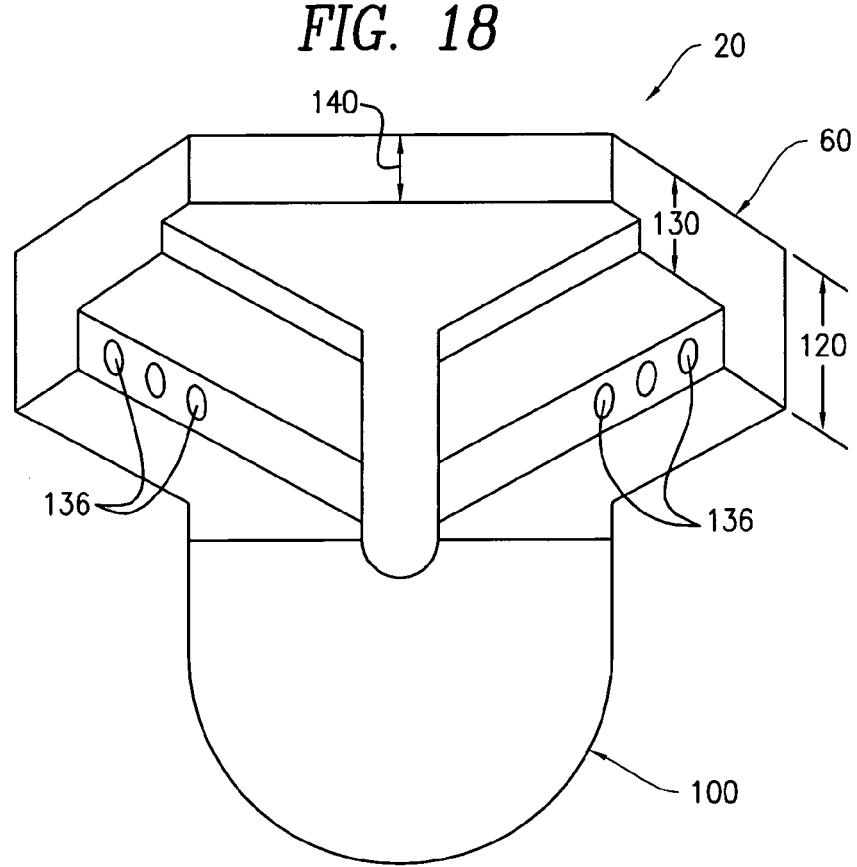
FIG. 19 is a top plan view of the mount of FIG. 18.

The embodiment of FIGS. 16 and 17 show openings 132 extending through level 120 of upper member 60 of mount 10, with no openings extending through level 130 as described hereinabove. In this embodiment, level 120 of upper member 60 of mount 10 would be the mounting section of mount 10. It is also possible for surface 34 of panel 30 to touch the earlier mounting surface of level 130 when mounted in the manner of FIGS. 16 and 17. Here also, opening(s) 132 can take the various shapes discussed earlier herein.

Figure 10:
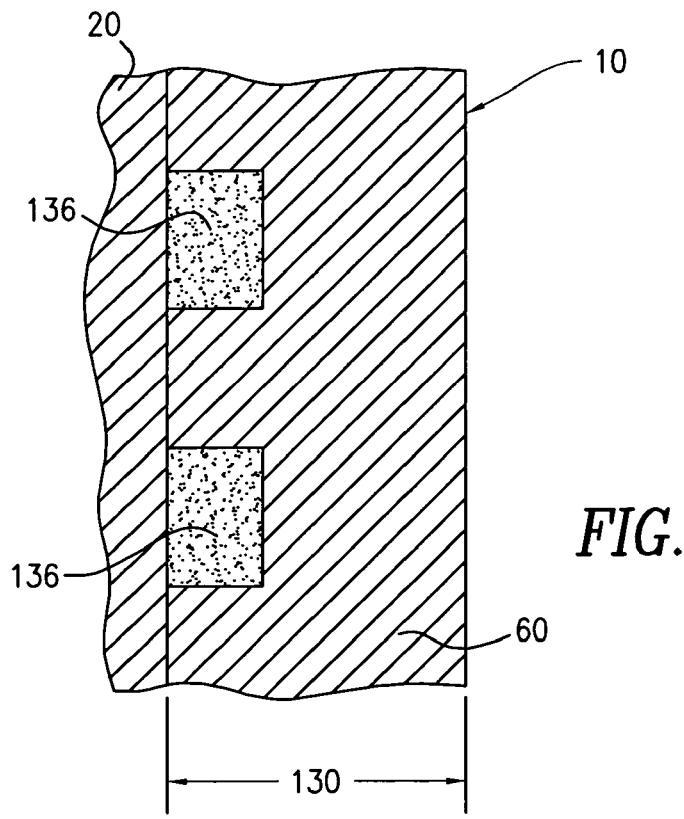
FIG. 10 is a cross-sectional view taken along line 10-10 of FIG. 9.
Figure 11:
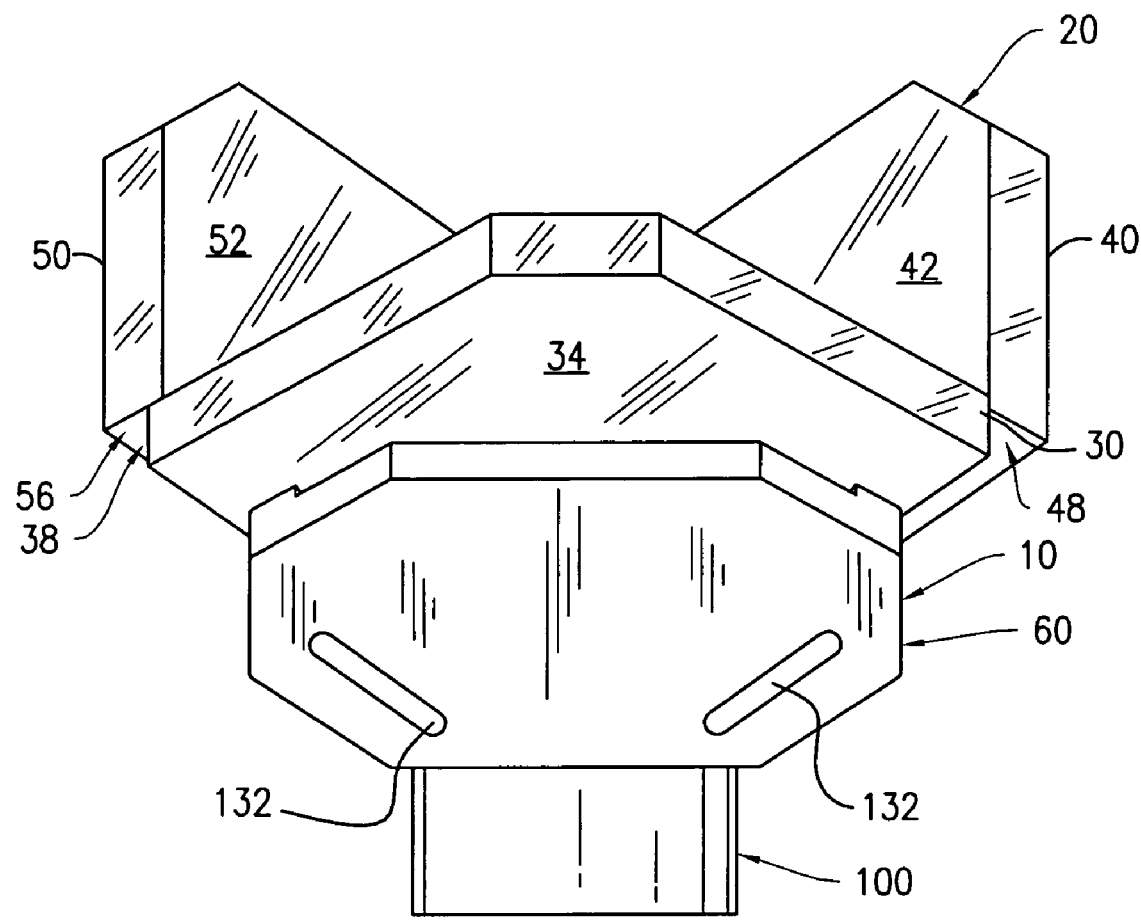
FIG. 11 is a rear elevational view of a further alternate embodiment of a mount made in accordance with the invention.

Turning to the embodiment shown in FIGS. 9, 10, 18 and 19, it is seen that openings 132 are now cavities 136 and no longer extend completely through the mounting section of mount 10. Instead, cavity(ies) 136 are formed in essentially the same orientations as for the earlier described embodiments; i.e., in levels 120 or 130, and in singular or multiple manners. Adhesive 134 is applied within cavity(ies) 136 as seen in FIG. 10, and when surface 34 of panel 30 of optical structure 20 is abutted against mount 10, portions of surface 34 touch adhesive 134 and ultimately mount optical structure 20 to mount 10. As indicated, therefore, the manner of mounting optical structure 20 onto mount 10 for this embodiment is similar to the mounting method described above differing, however, in the sequencing of the adhesive applying step. While the earlier described construction first abutted optical structure 20 against the relevant portions of mount 10, in this embodiment where openings 132 are cavities 136 that do not extend all of the way through the mounting section of mount 10, one cannot first abut the two members together before applying the adhesive. Instead, adhesive 134 must first be applied into cavities 136 and then optical structure 20 can be abutted against mount 10 and adhesive 134. In this embodiment also, cavity(ies) 136 can take the various shapes described earlier herein.

The manner of mounting described herein is an improvement over prior mounting manners and is equally good at preventing distortion of reflective surface 32 (and therefore of reflective surfaces 42 and 52) so as to help maintain reflective surfaces 32, 42 and 52 in their substantially perpendicular relationship to each other.

It will also be seen that the manner of mounting described herein achieves substantial rigidity between optical structure 20 and mount 10. The preferred low coefficient of thermal expansion metal alloy material which makes up mount 10 significantly reduces the effects of thermal expansion/contraction of mount 10 so as to substantially minimize these effects on the accuracy of optical structure 20.

It will thus be seen that the objects set forth above, among those made apparent from the preceding description, are efficiently attained, and, since certain changes may be made in the above constructions without departing from the spirit and scope of the invention, it is intended that all matter contained in the above description and shown in the accompanying drawings shall only be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A mount for an optical structure, said optical structure having at least one mounting surface, comprising:
    at least one mounting section;
    at least one surface extending along at least a portion of said at least one mounting section for abutting receipt thereagainst of a portion of said at least one mounting surface of said optical structure, both said at least one mounting section and said at least one surface of said at least one mounting section having at least one opening extending therethrough for receipt of adhesive therein, wherein said adhesive will at least partially fill said at least one opening and touch a portion of said at least one mounting surface of said optical structure over a surface area substantially conforming to a cross-sectional size of said at least one opening in order to adhere said optical structure to said mount.

2. A mount as recited in claim 1, wherein said at least one opening has a cross-sectional shape from the group of shapes consisting of a circle, a square, a rectangle, a triangle, a diamond, an oval and a star.

3. A mount as recited in claim 1, at least a portion of said at least one opening comprising a curvilinear cross-section.

4. A mount as recited in claim 1, wherein said at least one opening is elongate.

5. A mount as recited in claim 4, said elongate opening comprising a curvilinear cross-section.

6. A mount as recited in claim 1, wherein said at least one mounting section further comprises another surface substantially perpendicularly oriented with respect to said at least one surface, for receiving thereagainst another surface of said optical structure.

7. A mount as recited in claim 6, wherein said optical structure is not adhered to said another surface of said at least one mounting section of said mount.

8. A mount as recited in claim 1, being made of a metal alloy having a low coefficient of thermal expansion.

9. A mount as recited in claim 1, further comprising a base located substantially below said at least one mounting section, said base having connection means for attaching said mount to another object.

10. A mount as recited in claim 9, said connection means comprising a threaded bore extending into said base.

11. A mount as recited in claim 9, said connection means comprising an element extending from said base.

12. A mount as recited in claim 11, said element being threaded.

13. A mount as recited in claim 1, wherein said at least one surface of said at least one mounting section is two surfaces.

14. A mount as recited in claim 13, said two surfaces running substantially perpendicularly to each other.

15. A mount as recited in claim 14, wherein said at least one opening is a plurality of openings extending along said two surfaces of said at least one mounting section.

16. A mount for an optical structure, said optical structure having at least one mounting surface, comprising:
    at least one mounting section;
    at least one surface extending along at least a portion of said at least one mounting section for abutting receipt thereagainst of a portion of said at least one mounting surface of said optical structure, both said at least one mounting section and said at least one surface of said at least one mounting section having at least one cavity for receipt of adhesive therein, wherein said adhesive will at least partially fill said at least one cavity and touch a portion of said at least one mounting surface of said optical structure over a surface area substantially conforming to a cross-sectional size of said at least one cavity in order to adhere said optical structure to said mount.

17. A mount as recited in claim 16, wherein said at least one cavity extends totally through said at least one mounting section.

18. A mount as recited in claim 16, wherein said at least one cavity is elongate.

19. A mount as recited in claim 18, said elongate cavity comprising a curvilinear cross-section.

20. A mount as recited in claim 16, wherein said at least one mounting section further comprises another surface substantially perpendicularly oriented with respect to said at least one surface, for receiving thereagainst another surface of said optical structure.

21. A mount as recited in claim 20, wherein said optical structure is not adhered to said another surface of said at least one mounting section of said mount.

22. A mount as recited in claim 16, being made of a metal alloy having a low coefficient of thermal expansion.

23. A mount as recited in claim 16, further comprising a base located substantially below said at least one mounting section, said base having connection means for attaching said mount to another object.

24. A mount as recited in claim 23, said connection means comprising a threaded bore extending into said base.

25. A mount as recited in claim 23, said connection means comprising an element extending from said base.

26. A mount as recited in claim 25, said element being threaded.

27. A mount as recited in claim 16, wherein said at least one surface of said at least one mounting section is two surfaces.

28. A mount as recited in claim 27, said two surfaces running substantially perpendicularly to each other.

29. A mount as recited in claim 28, wherein said at least one cavity is a plurality of cavities extending along said two surfaces of said at least one mounting section.

30. A method of mounting an optical structure onto a mount, comprising the steps of:
    forming a mount having at least one mounting section and at least one surface extending along a portion of said at least one mounting section;
    forming at least one opening extending through said at least one surface and said portion of said at least one mounting section;
    abutting a portion of a surface of said optical structure against said at least one surface of said at least one mounting section;
    applying adhesive into said at least one opening of said at least one mounting section so that said adhesive at least partially fills said at least one opening and touches said surface of said optical structure over a surface area substantially conforming to a cross-sectional size of said at least one opening; and
    allowing said adhesive to dry within said at least one opening and touching said surface of said optical structure.

31. A method as recited in claim 30, wherein said first forming step comprises forming two mounting sections oriented substantially perpendicularly to each other, with each having a surface and at least one opening extending therethrough.

32. A method as recited in claim 30, said applying step being achieved through injection of said adhesive into said at least one opening.

33. A method of mounting an optical structure onto a mount, comprising the steps of:
  forming a mount having at least one mounting section and at least one surface extending along a portion of said at least one mounting section;
  forming at least one cavity in said at least one surface of said portion of said at least one mounting section;
  applying adhesive into said at least one cavity so that said adhesive at least partially fills said at least one cavity;
  abutting a portion of a surface of said optical structure against said at least one surface of said at least one mounting section so that at least a portion of said portion of said surface of said optical structure comes into contact with a portion of said adhesive over a surface area substantially conforming to a cross-sectional size of said at least one cavity; and
  allowing said adhesive to dry within said at least one cavity and in contact with said portion of said portion of said surface of said optical structure.

34. A method as recited in claim 33, wherein said first forming step comprises forming two mounting sections oriented substantially perpendicularly to each other, with each having a surface and at least one cavity.

* * * * *